April 12, 1932. J. CLARK 1,853,549
METHOD OF REENFORCING WELDED PIPE JOINTS
Filed Sept. 17, 1929 2 Sheets-Sheet 1
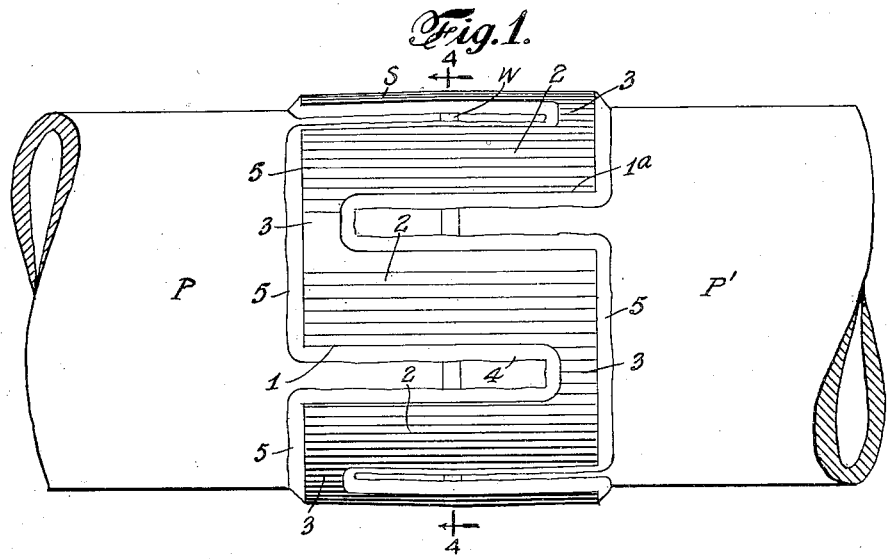
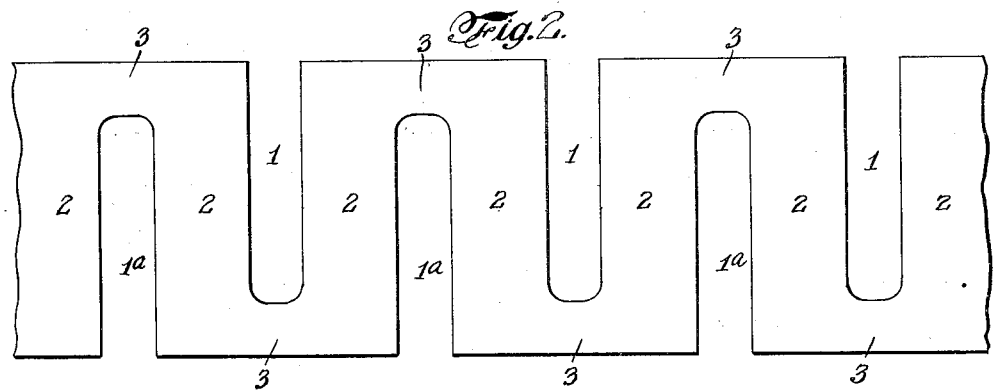
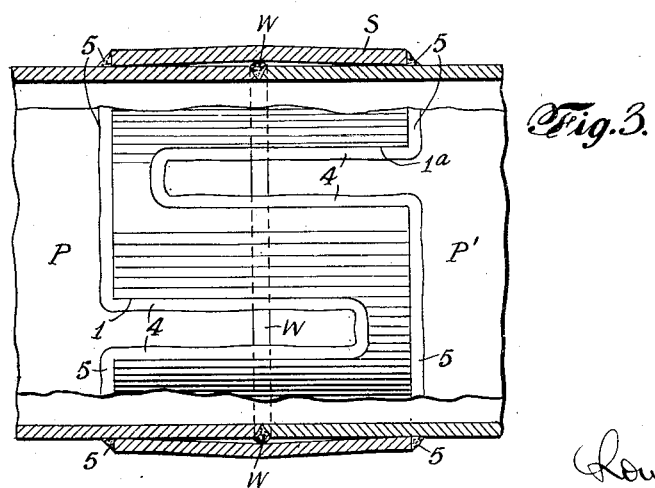
INVENTOR
JAMES CLARK
BY
ATTORNEY April 12, 1932. J. CLARK 1,853,549

METHOD OF REENFORCING WELDED PIPE JOINTS

Filed Sept. 17, 1929    2 Sheets-Sheet 2

INVENTOR
JAMES CLARK
BY
Thomas Trevor Whitaker
ATTORNEY

Patented Apr. 12, 1932

1,853,549

UNITED STATES PATENT OFFICE

JAMES CLARK, OF BRADFORD, PENNSYLVANIA, ASSIGNOR TO S. R. DRESSER MANUFACTURING CORPORATION, OF BRADFORD, PENNSYLVANIA, A CORPORATION OF PENNSYLVANIA

METHOD OF REENFORCING WELDED PIPE JOINTS

Application filed September 17, 1929. Serial No. 393,298.

My invention consists in the novel features hereinafter described, reference being had to the accompanying drawings which illustrate one embodiment of the same selected by me for purposes of illustration, and the said invention is fully disclosed in the following description and claims.

My invention consists in an improved method of reenforcing the welds by which the ends of adjacent pipe sections are connected as in a pipe line. Where a pipe line is formed by welding together the butted ends of pipe sections, it has been found that the welded joints generally have an efficiency less than an integral part of the same cross-section, and that therefore the welded joints in such pipe line are the weakest points in the line, and that leaks in such a line almost invariably develop at the weld. The object of my present invention is to reenforce the annular welds between the butted ends of the pipe sections in such manner that this lack of efficiency or strength at the welds is entirely obviated, and the welded joints are in fact made stronger than the normal unwelded section of the pipe.

In carrying out my invention, I first make a cylindrical reenforcing device or sleeve of such internal diameter that it will slip over the annular weld between the butted ends of two pipe sections and extend a distance on either side thereof. This sleeve is provided with two circular series of slots disposed parallel to the axis of the sleeve and extending inwardly alternately from the opposite end edges of the sleeve for a distance only slightly less than the length of the sleeve, thus providing a plurality of longitudinally disposed and substantially parallel portions separated by slots having substantially parallel edges and connected alternately at opposite ends of the sleeve. Such a sleeve is capable of being expanded or contracted to increase or decrease its diameter, if necesary, in forcing it over the projecting portions of the butt weld, and the longitudinally extending portions are capable of being sprung or bent inwardly so as to bring their opposite ends into contact with the portions of the pipe sections on the opposite sides of the weld. The slotted reenforcing sleeve is placed upon and centered over the weld and is firmly welded to the adjacent pipe sections along the edges of the slots therein, and it may also be welded to the pipe sections along the end edges of the sleeve, if desired. The welds along the interior edges of the slots will connect the sleeve to both of the adjacent pipe sections on opposite sides of the butt weld across which they will extend, and the reenforcing sleeve if further welded along its end edges will be united at these points to each of the adjacent pipe sections, thus not only reenforcing the butt weld, but making the joint the strongest part of the line, as the longitudinally extending portions of the reenforcing sleeve must be literally pulled apart before the ends of the pipe sections united by the butt weld can separate. In the accompanying drawings which illustrated one embodiment of my invention selected by me for purposes of illustration, Fig. 1 is an elevation of portions of adjacent pipe sections having their butt welded together and reenforced in accordance with my present invention.

Fig. 2 represents a plan view of the cylindrical reenforcing member as it would appear if cut and laid out in a horizontal plane.

Fig. 3 is an enlarged view partly in section of the welded and reenforced joint.

Figure 4:
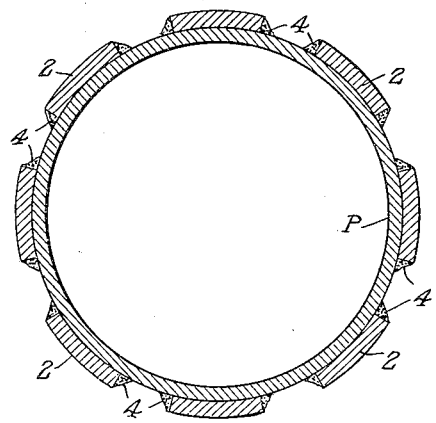
Fig. 4 represents a transverse section on the line 4—4 of Fig. 1 through the reinforcing sleeve and one of the pipe sections.
Figure 5:
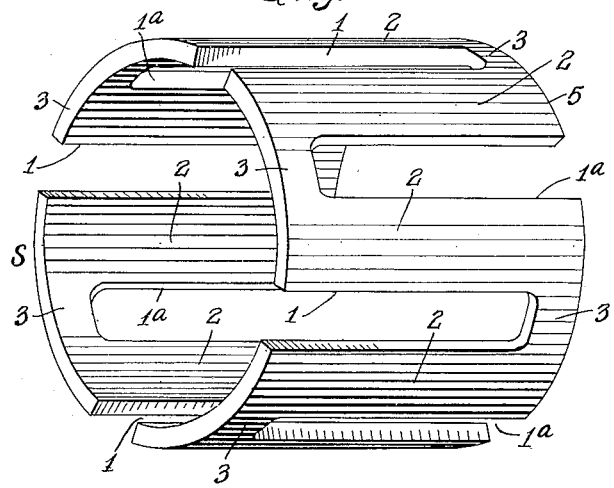
Fig. 5 is a perspective view of my reenforcing sleeve.

In the drawings, P and P¹ represent sections of pipe, the adjacent ends of which are butt welded as at W, in any desired manner, as for example by the oxy-acetylene welding process or by the electric arc welding process. In carrying out my present invention, I first form a reenforcing sleeve, indicated at a whole at S, and shown in detail detached in Fig. 5. This sleeve may be formed initially from a section of tube or pipe of wrought metal, for example, having an internal diameter substantially the same as the external diameter of the pipe sections, P, P¹, or it may be formed by bending a flat piece of skelp into cylindrical form and welding the ends together in a well known way. In the sleeve, S, two annular series of longitudinally disposed slots are formed, indicated at 1 and 1ª, the slots of each series extending from one end of the sleeve to a point near the opposite end, and the slots of one series being in staggered relation with the slots of the other series. This construction is very clearly illustrated in Fig. 2, which represents a plan view of the sleeve as it would appear if it was cut and laid out in a horizontal plane. The slots can be formed in any usual or desired manner, and if the sleeve is to be formed from a skelp, the slots may be stamped out or otherwise formed in the skelp before the ends are welded together, in which case the slotted skelp would have the appearance illustrated in Fig. 2.

The reenforcing sleeve when ready for use will therefore comprise a plurality of longitudinally disposed portions, 2, each connected at its opposite ends to an adjacent longitudinal portion, by the connecting portions, 3, at the inner ends of the slots. It will be seen that the zig-zag structure of the sleeve thus provided permits it to be expanded or contracted in diameter to insure its fitting the pipe sections with which it is used. The sleeve thus formed is slipped over one of the pipe sections and moved over the joint until it extends equally on opposite sides of the weld, W, between the pipe sections in the manner indicated in Figs. 1 and 3. If the weld, W, as is usually the case, projects slightly beyond the outer face of the pipe sections, the ring can be forced over the weld and will expand its diameter sufficiently to accommodate the weld. After the ring is placed in position with respect to the weld, the opposite ends of the longitudinally disposed portions, 2, and the connecting portions, 3, can be forced inwardly into contact with the pipe sections which they enclose, by the use of suitable clamps, and held while the welding operation which connects the reenforcing sleeve with the pipe sections is effected. When in final position for welding the diameter of the sleeve will be greater adjacent to its longitudinal central portion than at its ends, and the longitudinal portions, 2, will be bent over the projecting portions of the annular weld, as clearly shown in Fig. 3. This will assist in the welding operation and insure better welding.

The sleeve, S, is welded to the pipe sections along the edges of each recess, 1 and 1ª, preferably by the use of the electric welding machine and the welding rod, and the formation of a fillet, which is indicated at 4. I also prefer to weld the sleeve, S, to the pipe sections along the end edges of the sleeve in the same manner, the fillets so produced being indicated at 5, and being continuous with the fillets, 4, of the adjacent series of slots. It may be, however, that in some instances the welding of the sleeve, S, to the pipe sections along the end edges may be unnecessary and may therefore be dispensed with. It will be seen that each longitudinal portion, 2, of the reenforcing sleeve, S, is connected at its opposite sides for nearly its entire length, by the fillets, 4, with the pipe sections, and that these fillets extend across the butt weld, W, and firmly unite the sleeve, S, to the pipe sections on both sides of the weld, W. When the fillets, 5, are formed, the sleeve, S, is additionally united to the pipe sections on opposite sides of the weld, W. Obviously any force tending to separate the pipe sections, P, P¹, from each other would have to disrupt the solid metal portions, 2, of the sleeve before separating the pipes, and therefore the welded joints will be greatly strengthened and will in fact be ordinarily stronger than the pipe section itself between its ends.

It is to be noted that in carrying my invention into effect, no machine work is required on the pipe sections to prepare them to receive the reenforcing sleeves. The reenforcing sleeves can be made in quantity for the different sizes of standard pipe, as their yielding quality enables them to be expanded or contracted in diameter to compensate for any irregularities in the exterior surface of the pipe sections. Moreover, the reenforcing sleeves can be readily applied to the joints as the pipe sections are laid in a line and butt welded together. By the use of my invention the difficulties heretofore experienced with welded joints, causing serious loss by leakage of fluid, as natural and artificial gas, oil, etc., may be entirely obviated, and a practically impervious welded pipe line obtained. By the use of my invention it is practically impossible for the joints to break or crack at the butt weld between pipe sections, and these joints, as before stated, instead of being the weakest points in the line will in fact be the strongest points.

Figure 6:
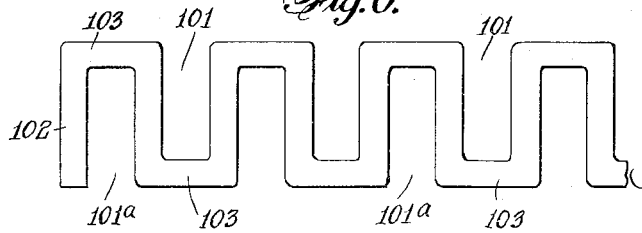
Fig. 6 is a plan view of a modified form of blank for the reenforcing sleeve.

As previously stated the reenforcing ring may be made in the form of a blank from a flat skelp, having the form shown in Fig. 2, and the ends of the blank may be welded together to form the ring. In Fig. 6, I have shown another form of blank which is conveniently made from a bar of wrought metal of any desired cross section, as round, square, or rectangular, which is bent into zig-zag form so as to form a flat blank having spaced parallel portions, 102, disposed transversely of the blank, and separated by slots or recesses, 101 and 101ª, each extending from one edge of the blank to a point near the other edge thereof, said parallel portions, 102, being each connected at one edge of the blank to the portion, 102, at one side thereof, and at the other edge of the blank to the portion, 102 on the other side thereof, connecting portions being shown at 103.

This forms a blank substantially like that shown in Fig. 2, but without any waste of material such as would occur in forming the blank from a flat skelp, or forming the reenforcing ring from a tube and cutting out the portions to form the slots.

It will also be understood that where the skelp is prepared either in the form shown in Fig. 2, or in the form shown in Fig. 6, it may be made up in the proper length to form a ring for any standard size of pipe, and welded at the factory, or the blanks may be shipped flat to the place of use and bent into ring form and welded to form the reenforcing rings as needed. It will also be understood that the blanks may be made in either of the forms shown and described and in lengths suitable for a plurality of reenforcing rings of the same diameter, or different diameters, and may be shipped flat to the place of use and cut into proper lengths, bent and welded. In this way the same blank may be used in the formation of reenforcing rings for several standard sizes of pipes, if desired, and this may be found a convenience as where a line is being laid with branch lines of a different diameter.

What I claim and desire to secure by Letters Patent is:—

1. The herein described method of reenforcing the circular butt weld uniting adjacent pipe sections, which consists in surrounding the weld and marginal portions of the pipe sections with an integral wrought metal sleeve, capable of yielding to increase or decrease its diameter, compressing the end portions of the sleeve to bring them into contact with the pipe sections, and welding the sleeve to the pipe sections.

2. The herein described method of reenforcing the circular butt weld uniting adjacent pipe sections, which consists in surrounding the weld and marginal portions of the pipe sections with an integral wrought metal sleeve, capable of yielding to increase or decrease its diameter variably at different points in its length, compressing the end portions of the sleeve into contact with the pipe sections, and bending intermediate portions of the sleeve over projecting portions of the weld, and welding the sleeve to the pipe sections.

3. The herein described method of reenforcing the circular butt weld uniting adjacent pipe sections, which consists in surrounding the weld and marginal portions of the pipe sections with an integral wrought metal sleeve, capable of yielding to increase or decrease its diameter, said sleeve having spaced substantially parallel longitudinal portions separated by slots having substantially parallel edges and extending alternately from opposite ends of the sleeve past the longitudinal center thereof and nearly to the opposite end, compressing the end portions of the sleeve to smaller diameter than the central portion, and into contact with the pipe sections, and bending the longitudinal portions of the sleeve over projecting portions of the annular weld, and welding the sleeve to said pipe sections.

In testimony whereof I affix my signature.

JAMES CLARK.